May 26, 1964   J. O. MEANS ETAL   3,134,436
COMPOSITION FOR USE IN WELL TREATMENT
Filed Oct. 13, 1958
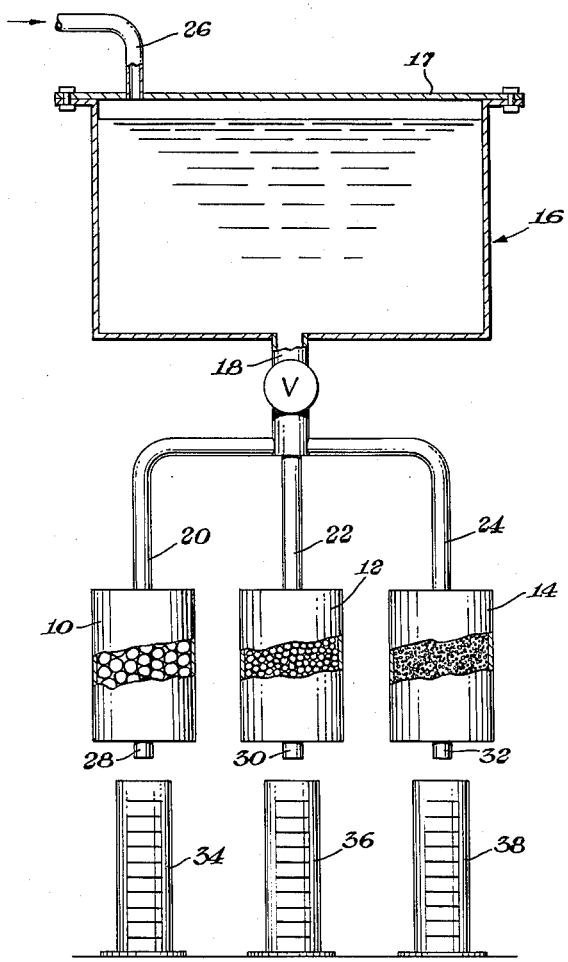
INVENTORS.
James O. Means
Frank H. Braunlich, Jr.
Alfred R. Hendrickson
BY C.W.Carlin
ATTORNEY United States Patent Office 3,134,436
Patented May 26, 1964

3,134,436
COMPOSITION FOR USE IN WELL TREATMENT
James O. Means, Frank H. Braunlich, Jr., and Alfred R. Hendrickson, Tulsa, Okla., assignors to The Dow Chemical Company, Midland, Mich., a corporation of Delaware
Filed Oct. 13, 1958, Ser. No. 766,739
7 Claims. (Cl. 166—33)

The invention relates to the mitigation of the loss of fluid from well-treating compositions containing a phenolicaldehyde resin while being emplaced in a well. Such compositions are employed to provide a fluid-permeable barrier against detritus entering a producing well from incompetent subterranean formations.

Wells often traverse porous strata which do not produce desired fluids. Such strata are often troublesome because they yield undesirable fluids, e.g., brine or water in an oil-producing well, which contaminates the oil. Sometimes such strata do not yield fluids but are troublesome because they act as a thief zone and take up fluid being produced or fluid employed in treating the well. It has been found helpful to seal off such strata or zones by injecting a neat cement slurry or a fluid resinous composition into the well which sets to a unitary mass and serves as a seal against intruding fluids and/or a seal against loss of treating fluids or the fluid sought to be produced.

When casing is set in a well, it is customary to cement it securely in position. Neat cement slurries or fluid-resinous compositions are commonly employed for this purpose.

A still further use for resinous compositions, and especially those containing phenol aldehyde stage B type resins in the treatment of wells, is to provide a fluid permeable barrier therein. Wells, producing from fluid-bearing horizons or intervals located in formations which tend to crumble or erode away to form detritus due to the flow therethrough of the fluid being produced, frequently become choked due to the deposition of such detritus in the flow passages and in the wellbore. Some of such detritus usually succeeds in passing up the wellbore itself where it is highly objectionable because of its deleterious abrasive effect upon close-fitting moving mechanical parts. Some of such detritus sometimes deposits neither in the passages, wellbore, nor between moving parts but is produced along with the fluid, e.g., crude oil, which condition results in a high percentage of mud and bottom sediment and adversely affects the marketability of the crude.

Seriousness of the problems presented by incompetent formations has prompted a number of proposals for their solution. Among such proposals have been attempts either to consolidate such formations or to provide a fluid-permeable barrier about the wellbore where it passes through such formations. Varying degrees of success have resulted from such proposals. Among the more successful proposals are those described in U.S. Patents 2,573,690, 2,674,323, 2,823,753, and copending application S.N. 617,373, filed October 22, 1956. In each of these patents and application, there is described the use of a partially condensed or stage B phenol-aldehyde resin to overcome the problems presented by incompetent formations. Although individual patentable features, modifications and improvements in the use of the phenol-aldehyde resin distinguish these patents and application from one another, they contain in common the emplacement in a well at the incompetent formation a phenol-aldehyde resin which sets into an integrated mass in situ which serves to consolidate the incompetent formation into a fluid-permeable competent formation or to provide a fluid-permeable barrier about the wellbore where it passes through the incompetent formation.

Although various ways have been set forth for the purpose of attaining the objects of the use of compositions containing a phenol-aldehyde type resin, for treating a well, one obstacle associated with its use has persisted. The obstacle is the loss of the fluid phenol-aldehyde resin composition while it is being emplaced in the well and particularly while so emplaced prior to its setting to a non-fluid state.

While the fluid resin composition is in contact with the walls of the wellbore or the face of the formation, there is some loss of fluid into the formation thus in contact. When the wellbore or face of the formation is particularly loose or porous, this loss is excessive. As a result of such loss, not only is much resin material wasted, but the resinous material largely deposits on the more readily accessible areas of the formation with a paucity of deposition on the less accessible areas. Such unequal distribution results in those areas of the formation which form the face of the relatively narrow winding channels and passageways being but little coated and such passageways or channels remaining substantially unaffected, thereby largely defeating the objects of the treatment.

A need, therefore, exists for a phenol-aldehyde type fluid resin useful in well treating compositions which sets or hardens in situ to a unitary mass and which has a lower fluid loss while in such fluid condition than similar compositions now in use.

A principal object of this invention, consequently, is to provide a composition and method of use therefor which meets this need.

The attainment of this and related objects will be made clear in the ensuing description and is particularly defined in the claims appended hereto.

The invention consists of a phenol-aldehyde type well treating composition in which is incorporated a water-dispersible cellulose ether, either with or without the incorporation of a fine particulate material, and method of use therefor in treating wells particularly where such treatment consists of the emplacement of a phenolic type resin composition in an oil well for the prevention of detritus entering a well from an incompetent formation traversed by the well.

The cellulose ethers which may be employed in the practice of the invention are: the lower alkyl cellulose ethers, e.g., methylcellulose and ethylcellulose.

Examples of the fluid resin suitable for the composition of the invention are partially condensed phenolic type resins which set to fluid-permeable solids in situ. Such resins will be referred to herein as stage B resins. Examples of such resins are partially condensed or polymerized mixtures of cresylic acid and paraformaldehyde catalyzed by sodium hydroxide; mixtures of phenol and formaldehyde catalyzed by sodium hydroxide which are thereafter neutralized with hydrochloric acid, further polymerized with resorcinol and diluted in ethyl alcohol; mixtures of phenol and formaldehyde catalyzed by sodium hydroxide and neutralized with hydrochloric acid but to which no resorcinol is added nor vehicle such as alcohol; mixtures of phenol and formaldehyde catalyzed by sodium hydroxide and neutralized with hydrochloric acid but prior to the neutralization step with the acid has disodium hydrogen phosphate added thereto.

One embodiment of the invention consists of admixing the cellulose ether with the phenolic resin and incorporating therein fine silica sand in particles capable of passing through a 325 mesh sieve. Sand which has been ground to a flour or a fine powder having particle sizes below 6 microns is particularly recommended for the practice of the invention.

Methyl cellulose is the preferred cellulose ether to use in the practice of the invention. It markedly reduces the fluid loss of phenolic resin compositions while being emplaced in a well. Fine sand or sand flour may be used with any of the cellulose ethers used in the practice of the invention. However, methyl cellulose is highly effective without the addition of the fine sand or sand flour. When ethyl cellulose is used or carboxymethylhydroxyethylcellulose, for example, fine sand used therewith has been found to be highly beneficial. Methyl cellulose is obtainable on the market under various trade names one of which is Methocel. A marketable form of ethyl cellulose is Ethocel. The viscosity of a solution of a cellulose ether of a given concentration and at a specific temperature is a function of its molecular weight. The higher the viscosity of such solution, the higher is the molecular weight. Accordingly, the molecular weight of the cellulose ether is usually satisfactorily estimated for practical purposes by obtaining the viscosity of a standard solution of a specified concentration. The standard solution usually employed to obtain the viscosity of methyl cellulose is that of a 2% solution thereof in water at 20° C. The standard solution similarly employed for ethyl cellulose is that of a 5% solution thereof in a mixed organic solvent, usually either a 70% benzene-30% methanol or an 80% toluene-20% ethanol mixture by volume at 25° C. The cellulose ethers used in the invention may have a molecular weight of any value which permits pouring and admixing of the composition of the invention without undue thickening, for example one imparting, a viscosity to the resulting solution as above prepared of between 50 centipoises and 400 centipoises is satisfactory.

The temperature of the well to be treated must be taken into consideration when practicing the invention. The amount of catalyst employed in the resin composition will be partially controlled by the temperature of the well into which the resin is to be placed. Particular care has to be exercised when the composition is to be used at temperatures below 80° F. or above about 225° F.

To show the effect of different cellulose ethers when admixed with different phenol-aldehyde resins in accordance with the invention, a number of resins were made. Five types of phenolic-aldehyde resins were prepared which will be designated 1, 2, 3, 4 and 5 hereafter, and mixtures thereof designated resins 1-2, 3-4, etc., according to the composition of the mixture.

PREPARATION OF RESIN 1

1,085 pounds of cresylic acid and 904 pounds of paraformaldehyde and 32 pounds of a 50 percent by weight aqueous solution of sodium hydroxide were placed in a mixing vessel and mixed at a temperature of 130° F. until the paraformaldehyde had dissolved. This dissolution process required about 30 minutes and was exothermic to the extent that it was necessary to cool the vessel to maintain the desired temperature of 130° F. After the paraformaldehyde had dissolved, the reaction was acidified to a pH value of about 4 by the addition of hydrochloric acid. About 206 gallons of a resinous liquid having a viscosity of about 100 centipoises were thus produced. The resinous liquid was diluted by the addition thereto of about 480 gallons of ethyl alcohol, thereby producing 686 gallons of the resin diluted with the alcohol. The resulting diluted mixture had a specific gravity of 0.98.

PREPARATION OF RESIN 2

780 pounds of phenol were mixed with 1,012 pounds of 37 percent by weight aqueous formaldehyde and 100 pounds of a 50 percent by weight aqueous solution of sodium hydroxide. The mixture was heated to 175° and maintained at this temperature until a viscosity of 8 centipoises was obtained. This period was about 2½ hours. Hydrochloric acid was then added to the mixture to reduce the pH value to about 4, requiring 124.9 pounds of 32 percent hydrochloric acid. The addition of the acid produced two layers, an upper water layer and a lower resinous layer. The upper layer was then discarded. It left about 140 gallons of the resinous liquid having a viscosity of about 300 centipoises. To this resinous liquid were added 820 pounds of resorcinal which was thoroughly admixed therewith until it dissolved. There was thereby obtained about 210 gallons of the resinous liquid which was then diluted by the addition of 490 gallons of ethyl alcohol to make about 700 gallons of the diluted resinous liquid composition having a specific gravity of about 0.98.

Resin 1 and resin 2 were then thoroughly admixed together in equal parts by volume to make resin 1-2.

PREPARATION OF RESIN 3

390 pounds of phenol, 506 pounds of 37 percent by weight adqueous formaldehyde solution and 50 pounds of a 50 percent by weight solution of caustic soda in water were admixed together in a reaction vessel. This mixture was maintained at about 175° F. for about 2½ hours following which the aqueous reaction mass was acidified to a pH value of 4. 6.4 gallons of a 32 percent hydrochloric acid were required for this acidifying step. The addition of the acid caused the mixture to separate into two layers: the upper layer constituting about 38 percent of the original volume was salt water and after cooling to room temperature this layer was separated and discarded; the lower layer and a volume of about 62 percent of the original volume and comprises a slightly acid partially condensed aqueous phenol-formaldehyde resin. To this resin was added 410 pounds of resorcinol, which was stirred into it and thereby dissolved, forming an aqueous partially condensed phenol-formaldehyde-polyhyric phenol resinous solution. It had a viscosity of 150 centipoises and a specific gravity of 1.23. The molar ratio of the phenol, formaldehyde, and resorcinol was 1.11 moles of phenol, 1.665 moles of formaldehyde, and 1 mole of resorcinol.

PREPARATION OF RESIN 4

Resin 4 was prepared substantially according to the method employed in preparing resin 2 except that the partially condensed resinous acidified liquid product obtained was not diluted with ethyl alcohol.

PREPARATION OF RESIN 5

Resin 5 was made up substantially according to the method followed in preparing resin 1 above but without the step of mixing the resin with alcohol.

Resin 4-5 was prepared by mixing together in equal volumes resins 4 and 5.

To show the effect on fluid loss of phenol-aldehyde type resin compositions by addition of a cellulose ether thereto, the above described resins: 1-2, 3 and 4-5 were made up as described above, varying the amounts of the cellulose ether and finely ground sand added thereto in accordance with the invention, except those tests used as blanks for comparison, as set out in Table I. The viscosity values appearing in the tables are set forth as an indication of the molecular weight of the respective cellulose ethers. They are the viscosity values of solutions of the cellulose ethers in the selected solvent as hereinbefore explained, viz, a 2% aqueous solution for the methyl cellulose ether (at 20° C.) and a 5% solution, in an 80% toluene-20% ethanol mixture by volume, for the ethyl cellulose ether (at 25° C.). The fluid loss of the resins without any additive and with the additives including those of the invention were determined according to Recommended Practice for Standard Field Procedure for Testing Drilling Fluids (Tentative) API RP 29, 3rd Edition, May (1950)

of the American Petroleum Institute. The results are set out in Table I.

*Table I*

| Test No. | Phenol-aldehyde resin | Concentration of additive in lb./1000 gal. | Fluid loss (API Code 29) |
|---|---|---|---|
| 1 (Blank) | 1-2 | None | 300 ml. in 0.82 min. |
| 2 | 1-2 | 62.5 ethyl cellulose | 190 ml. in 30 min. |
| 3 (Blank) | 1-2 | 10.5 fine sand | 300 ml. in 29 min. |
| 4 | 1-2 | 62.5 ethyl cellulose; 10.5 fine sand. | 17.5 ml. in 30 min. |
| 5 | 1-2+32.5 ml. 25 percent sodium hydroxide per 1000 ml. resin. | ___do___ | 17.5 ml. in 30 min. |
| 6 | 1-2 | 62.5 methyl cellulose, 4000 cps. | 8.5 ml. in 30 min. |
| 7 | 1-2 | 62.5 methyl cellulose, 400 cps.; 10.5 fine sand. | 7 ml. in 30 min. |
| 8 | 1-2 | 62.5 methyl cellulose, 50 cps. | 20 ml. in 30 min. |
| 9 | 1-2 | 62.5 methyl cellulose, 50 cps.; 10.5 fine sand. | 7 ml. in 30 min. |
| 10 (Blank) | 1-2 | 100 blown asphalt | 300 ml. in 0.91 min. |
| 11 (Blank) | 1-2 | 100 guar gum | 300 ml. in 0.97 min. |
| 12 (Blank) | 4-5 | None | 27 ml. in 30 min. |
| 13 | 4-5 | 62.5 ethyl cellulose; 10.5 fine sand. | 5.5 ml. in 30 min. |
| 14 (Blank) | 3 | None | 300 ml. in 25 min. |
| 15 | 3 | 62.5 ethyl cellulose; 10.5 fine sand. | 10 ml. in 30 min. |

An evaluation of the test data shown in Table I leads to the conclusion that the high fluid loss shown by the phenol-aldehyde resin was very definitely reduced by the addition of ethyl cellulose alone and particularly reduced by the use of ethyl cellulose plus fine sand, by the addition of methyl cellulose alone, and by the addition of methyl cellulose and fine sand. It further shows that the presence of additional NaOH catalyst does not adversely affect the fluid loss properties. It also shows that the effect on the fluid loss of resin 1-2 by the addition alone of blown asphalt or guar gum was negligible. It shows that the inherent high fluid loss of resin 3 was definitely reduced by the addition thereto of ethyl cellulose and fine sand in the amounts stated. It also shows that, although the fluid loss of the 4-5 type resin was lower than that of the 1-2 resin or 3 resin, its fluid loss also was definitely reduced by the addition thereto of ethyl cellulose with fine sand. To show the effect of varying the amount of the cellulose ether and fine sand on the fluid loss of the 1-2 type resin, a series of tests was made in which the amount of cellulose ether and fine sand were varied.

*Table II*

| Test No. | Cellulose ether | Fine sand | Fluid loss in ml. (API Code 29) |
|---|---|---|---|
| 1 (Blank) | None | None | 300 in 0.82 min.* |
| 2 | 62.5 ethyl cellulose | None | 190 in 30 min.* |
| 3 (Blank) | None | 10.5 | 300 in 29 min.* |
| 4 | 62.5 ethyl cellulose | 2.5 | 100 in 30 min. |
| 5 | ___do___ | 5 | 49 in 30 min. |
| 6 | ___do___ | 10.5 | 17.5 in 30 min.* |
| 7 | ___do___ | 20 | 18 in 30 min. |
| 8 | 2.5 ethyl cellulose | 10.5 | 300 in 9 min. |
| 9 | 5 ethyl cellulose | 10.5 | 300 in 28 min. |
| 10 | 10 ethyl cellulose | 10.5 | 180 in 30 min. |
| 11 | 30 ethyl cellulose | 10.5 | 50 in 30 min. |
| 12 | 125 ethyl cellulose | 10.5 | 17 in 30 min. |
| 13 | 62.5 methyl cellulose, 4000 cps. | None | 8.5 in 30 min.* |
| 14 | ___do___ | 2.5 | 8.0 in 30 min. |
| 15 | ___do___ | 10.5 | 7 in 30 min.* |
| 16 | ___do___ | 20 | 7 in 30 min. |
| 17 | 2.5 methyl cellulose, 4000 cps. | 10.5 | 225 in 30 min. |
| 18 | 10 methyl cellulose, 4000 cps. | 10.5 | 85 in 30 min. |
| 19 | 30 methyl cellulose, 4000 cps. | 10.5 | 15 in 30 min. |
| 20 | 125 methyl cellulose, 4000 cps. | 10.5 | 6.5 in 30 min. |

*These tests were repeated from Table I for ready comparison.

The results set out in Table II show that when methyl cellulose is admixed in an amount of 62.5 pounds or more per 1000 gallons of resin, a marked reduction in fluid loss results; that this reduction is more marked when fine sand is admixed with the resin, such reduction being particularly marked when 10.5 pounds of fine sand are admixed with 62.5 pounds of ethyl cellulose per 1000 gallons of resin; that an amount of methyl cellulose of 2.5 pounds when employed with 10.5 pounds of fine sand resulted in some reduction in fluid loss and that the fluid loss was progressively decreased when the methyl cellulose was increased to 10, to 30, to 62.5 and to 125 pounds per 1000 gallons of resin. The improvement resulting from greater than 62.5 pounds of cellulose ether per 1000 gallons of resin appeared to be too small to support a recommendation for use of such greater quantities.

The results of Table II also shown that ethyl cellulose in an amount of 62.5 pounds per 1000 gallons of resin is effective, but such effectiveness is definitely progressively improved by the synergistic effect of 2.5, 5, and 10.5 pounds of fine sand per 1000 gallons of resin employed with the ethyl cellulose and that when the fine sand is present in the amount of 10.5 pounds, the ethyl cellulose is significantly progressively more effective when increased to 30 pounds per 1000 gallons of resin.

From the table, recommended amounts of lower alkyl cellulose ether and fine sand to employ in the practice of the invention appear to be between 50 and 125 pounds of the ether and between 2.5 and 20 pounds of fine sand per 1000 gallons of resin. About 62.5 pounds of the cellulose ether and about 10.5 pounds of the fine sand appear to be optimum amounts to employ.

To ascertain the effect of temperature on the fluid loss of resin 1-2 described above when admixed with the alkyl cellulose ether and fine sand according to the invention, four tests were run, the results of which are set out in Table III. 63.5 pounds of ethyl cellulose and 10.5 pounds of fine sand having a size between 1 and 5 microns were admixed with 1000 gallons of the resin.

*Table III*

| Temperature °F.: | Fluid loss in 30 minutes, ml. |
|---|---|
| 80° | 17.5 |
| 140° | 70 |
| 175° | 120 |
| 200° | 180 |

The results of Table III show that the reduction in fluid loss is most marked at about room temperature, but that an appreciable reduction is realized at considerable higher temperatures such as are sometimes encountered in wells.

Three tests were made to show the rate of penetration of an aldehyde-phenol fluid resin prior to its setting to a unitary mass. Testing apparatus of the types shown in the drawing was set up. It consists essentially of three cylindrical chambers 10, 12 and 14, each of which is one inch in diameter and two inches long, closed at each end except for a centrally positioned opening in each end to provide ingress at the top and egress at the bottom of a fluid. The chambers are positioned vertically and each packed with a different grade of sand simulating the material found in oil-producing formations. The sands in chambers 10, 12 and 14 are designated coarse, medium, and fine, respectively, the classification being based upon the permeability as determined by employing kerosene according to Darcy's law, the results of which are set out in Table IV. Resin supply reservoir 16 having removable cover 17 thereon is positioned above the chambers and provided with valve-controlled outlet tube 18 which trifurcates into tubes 20, 22 and 24 which are tightly affixed about the openings in the tops of chambers 10, 12 and 14, respectively. Pressurized air supply line 26 opens into the reservoir from a source, not shown. Outlet nipples 28, 30 and 32 extend downwardly from chambers 10, 12 and 14, respectively, below which are graduated receivers 34, 36 and 38, respectively.

The procedure followed in running each of the three tests consisted of placing a Stage B phenolic resin in reservoir 16, applying air pressure thereto, and measuring the volume of fluid passing through each grade of sand each minute. The results are set forth in Table IV.

The resin employed in each of the tests consisted of 500 milliliters of resin 1-2 (an intermixture of 50 percent resin 1 and 50 percent 2 by volume) with which 13.26 milliliters of 25 percent aqueous NaOH had been admixed.

Test 1 was run on the resin only for comparison purposes. The procedure followed in Test 1 consisted of placing the resin at 80° F. in reservoir 16, applying a pressure of twenty p.s.i. thereon by introducing air through line 26 and determining the initial and final percentage of resin passing through the fine, medium, and coarse sands in chambers 10, 12 and 14, respectively, by measuring the quantities in receivers 34, 36 and 38. Initial percent flow was based on flow during the first two minutes and the final percent flow on the flow during the final two minutes of each test. Table IV sets out the percentage of the total resin leaving reservoir 16 which passed through the sand in each chamber during the first two minutes and during the final 2 minutes of the period of each test. To illustrate, 94.1 percent of the total flow through the three chambers in the first two minutes passed through the coarse sand, 4.7 percent through the medium sand and 1.2 percent through the fine sand when no fluid loss additive was present in the resin. Total volume through means the total number of milliliters of resin passing through the sands during the period of the test as set out in the table.

Test 2 illustrates the effect on permeability and fluid loss of resin by employing the same resin used in Test 1 but to which had been admixed 63.5 pounds of ethylcellulose and 10.5 pounds of a fine sand having a particle size of between 1.5 and 6.0 microns according to the invention. The pressure applied to the resin was 20 p.s.i. and the period of the test was 1.5 hours. The temperature of the resin was again 80° F. The procedure was generally that employed in Test 1.

Test 3 also illustrates the effect on permeability and fluid loss when the resin was treated, as in Test 2 in accordance with the invention. Test 3 differs from Test 2 by employing 100 p.s.i. air pressure at 140° F. for 1.25 hours.

Table IV

TEST 1.—NO FLUID LOSS ADDITIVE*

| Sand grade | Original permeability in millidarcies | Percent flow through each grade sand | | Volume through in 10 minutes in ml. | Fluid loss additive |
| --- | --- | --- | --- | --- | --- |
| | | During first two min. | During final two min. | | |
| Coarse | 5,880 | 94.1 | 93.7 | 438 | None. |
| Medium | 295 | 4.7 | 4.9 | 22 | Do. |
| Fine | 73 | 1.2 | 1.3 | 5.4 | Do. |

TEST 2.—FLUID LOSS ADDITIVE*

| Sand grade | Original permeability in millidarcies | Percent flow through each grade sand | | Volume through in 1.5 hrs. in ml. |
| --- | --- | --- | --- | --- |
| | | During first two min. | During final two min. | |
| Coarse | 5,880 | 94.1 | 26.1 | 123 |
| Medium | 295 | 4.7 | 52.1 | 19 |
| Fine | 73 | 1.2 | 21.8 | 7 |

Table IV—Continued

TEST 3.—FLUID LOSS ADDITIVE*

| Sand grade | Original permeability in millidarcies | Percent flow through each grade sand | | Volume through in 1.25 hrs. in ml. |
| --- | --- | --- | --- | --- |
| | | During first two min. | During final two min. | |
| Coarse | 2,950 | 60.3 | 34.4 | 217 |
| Medium | 1,475 | 29.3 | 50.3 | 322 |
| Fine | 491 | 10.4 | 15.3 | 91 |

*No fluid loss additive was present in Test 1; 63.5 lb. of ethyl cellulose and 10.5 lb. of fine sand (1.5 to 6.0 microns) were admixed with the resin in Tests 2 and 3.

Test 1 set out in Table IV shows that using a phenolic type resin without a fluid loss additive results in fluid entering the most permeable sand and that the flow rate ratio for each of the three grades of sand remained substantially constant throughout the test, as shown by the inconsequential difference between the initial and final flows therethrough. However, when a fluid loss additive is present in the resin as in Tests 2 and 3, the flow rate ratio changes as the test progresses, with the most permeable sand tending to plug somewhat, thereby resulting in a higher percentage of the resin entering the less permeable sand. For example, in Test 2, at the close of 1.5 hours at 20 p.s.i., 73.9 percent of the total resin containing cellulose ether and fine sand in accordance with the invention, which passed through the 3 grades of sand during the final 2 minutes, passed through the medium and fine sands whereas only 5.2 percent of the total resin passed through the medium and fine sand in Test 1 when no cellulose ether or sand was present.

The results of the tests set out in Table IV show that the presence of the cellulose ether definitely mitigates the loss of a fluid phenol-aldehyde type resin to porous sands of the type encountered in fluid-bearing formations and diverts the fluid resin to less porous zones which ultimately also become plugged to a large extent. They also show that the presence of finely divided sand of a size less than 6 microns supplements the cellulose ether in mitigating the loss of the fluid resin and that this is especially true when ethylcellulose is employed.

The corollary to using cellulose ether with or without finely divided sand in the resin is brought out by the tests which show that the fluid resin, untreated according to the invention, continues to pass through the more porous sand with which it comes in contact thereby constituting a considerable loss of the fluid prior to its setting. They show that this loss is more serious at higher pressures and does not noticeably abate over a longer treating period.

The following example illustrates treating an oil well according to the invention.

EXAMPLE

A recently drilled oil well having a depth of 3000 feet and a bottom hole temperature of 140° F. had been producing three months after which time sand had accumulated in the tubing to such an extent that further production therefrom was impractical. Upon pulling the tubing from the well, it was decided to treat the well with a suitable second-stage or B type resin to prevent the sanding up condition.

150 gallons of resin designated 1 hereinabove was admixed with 3.4 gallons of a 25 percent NaOH aqueous solution as a catalyst in a mixing tank and then with 150 gallons of resin designated 2 hereinabove and stirred for five minutes. Fluid loss additives were then admixed in accordance with the invention. They consisted of 18.7 pounds of ethyl cellulose (62.05 pounds per 1000 gallons of resin) and 3.15 pounds of fine sand of a particle size of less than 6 microns (10.5 pounds per 1000 gallons of resin). The resin containing the fluid loss additive was then squeezed into the formation and positioned at the incompetent zone according to conventional procedure. The well was closed in for 24 hours to provide a setting time for the resin to set to a monolithic or unitary mass. The well was then put back into production. No further trouble was encountered as a result of sanding up of the well showing the effectiveness of the well treating composition and method of treating wells in accordance with the invention.

Having described the invention, what is claimed and desired to be protected by Letters Patent is:

1. A well treating resinous composition settable to a substantially dry fluid-permeable material when injected into interstices and voids of an unconsolidated subterranean formation to convert said unconsolidated portions to consolidated fluid-permeable structures, consisting essentially of (1) a second stage phenol-aldehyde type resin selected from the class consisting of phenol-formaldehyde in a molar ratio of 1 phenol to about 1.5 formaldehyde, cresylic acid-paraformaldehyde in a molar ratio of 1 mole of the cresol group ($C_6H_4CH_3OH$) to about 3 moles of the aldehyde group ($CH_2O$), and phenol-formaldehyde-resorcinol in a molar ratio of 1 phenol to about 1.5 moles of formaldehyde to about 0.9 mole of resorcinol, and mixtures thereof and (2) between 50 and 125 pounds of a cellulose ether selected from the class consisting of methyl cellulose and ethyl cellulose per thousand gallons of the resin.

2. The well treating resinous composition of claim 1, which contains between 2.5 and 20 pounds of finely divided sand below 6 microns in size per thousand gallons of the resin.

3. The method of treating a well traversing a fluid-bearing formation consisting of injecting into the well and into interstices and voids of unconsolidated portions of the formation adjacent to the well, to convert said unconsolidated portions to a consolidated fluid-permeable mass a composition consisting essentially of a fluid phenol-aldehyde type self-hardening resin and an effective amount of a lower alkyl cellulose ether to lessen the loss of the resin while fluid and to aid in directing it into the less accessible areas of the formation being treated.

4. The method of treating a well traversing a fluid-bearing formation consisting of injecting into the well and into interstices and voids of unconsolidated portions of the formation adjacent to the well, to convert said unconsolidated portions to a consolidated fluid-permeable mass a composition comprising a phenol-aldehyde type self-hardening resin, a lower alkyl cellulose ether in an amount between 50 and 125 pounds per thousand gallons of the resin, and finely divided sand below 6 microns in size in an amount between 2.5 and 20 pounds per thousand gallons of the resin.

5. The method of positioning a fluid-permeable barrier in a well traversing an unconsolidated stratum in a subterranean formation consisting of admixing between 50 and 125 pounds of a cellulose ether selected from the class consisting of ethyl cellulose and methyl cellulose in a ratio of between 50 and 125 pounds per thousand pounds of a fluid partially-condensed resin selected from the class consisting of phenol-formaldehyde in a molar ratio of 1 phenol to about 1.5 formaldehyde, cresylic acid-paraformaldehyde in a molar ratio of 1 mole of the cresol group ($C_6H_4CH_3OH$) to about 3 moles of the aldehyde group ($CH_2O$), phenol-formaldehyde-resorcinol in a molar ratio of 1 phenol to about 1.5 formaldehyde to about 0.9 mole of resorcinol to prepare a pumpable self-hardening composition, pumping the composition into the well, and positioning it about the borehole of said well at the unconsolidated stratum.

6. The method of claim 5, wherein finely divided sand of a size below 6 microns is admixed with the cellulose ether-resin mixture in an amount between 2.5 and 20 pounds per thousand gallons of the resin.

7. The method according to claim 5 wherein said phenol-formaldehyde, partially-condensed resin was diluted with a volatile water-soluble alcohol prior to admixture therewith of said cellulose ether.

References Cited in the file of this patent

UNITED STATES PATENTS

| | | |
|---|---|---|
| 2,349,181 | Lerch et al. | May 16, 1944 |
| 2,352,468 | Burnam | June 27, 1944 |
| 2,462,253 | Booty | Feb. 22, 1949 |
| 2,541,688 | Cardwell | Feb. 13, 1951 |
| 2,556,169 | Crouch et al. | June 12, 1951 |
| 2,570,892 | White | Oct. 9, 1951 |
| 2,573,690 | Cardwell et al. | Nov. 6, 1951 |
| 2,592,659 | Cone | Apr. 15, 1952 |
| 2,747,671 | Nowak et al. | May 21, 1956 |